Sept. 22, 1959  A. J. PAVOL  2,905,370
TRAY ATTACHMENT FOR AUTOMOBILE GLOVE COMPARTMENTS
Filed Feb. 21, 1955
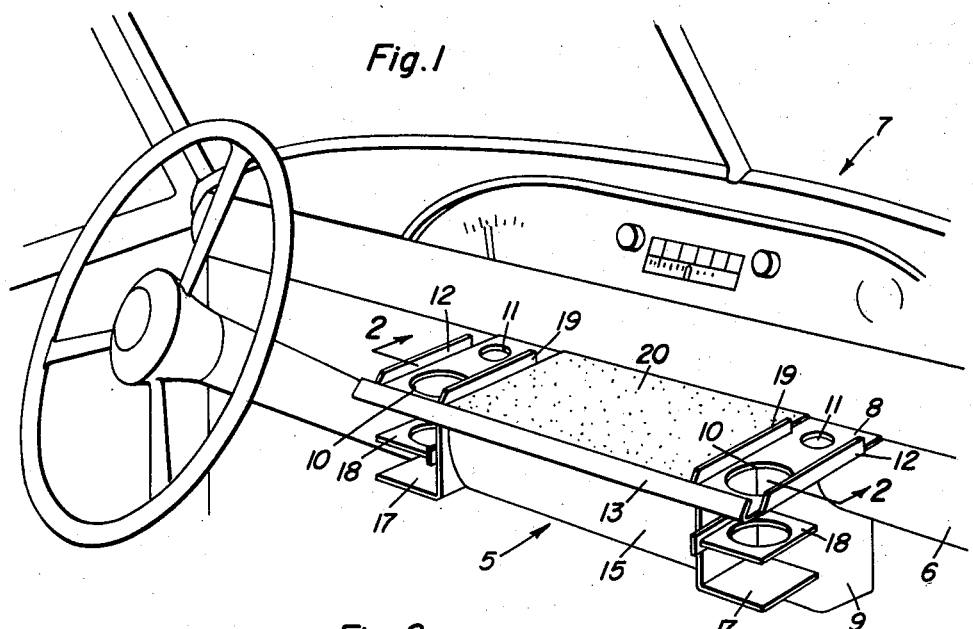
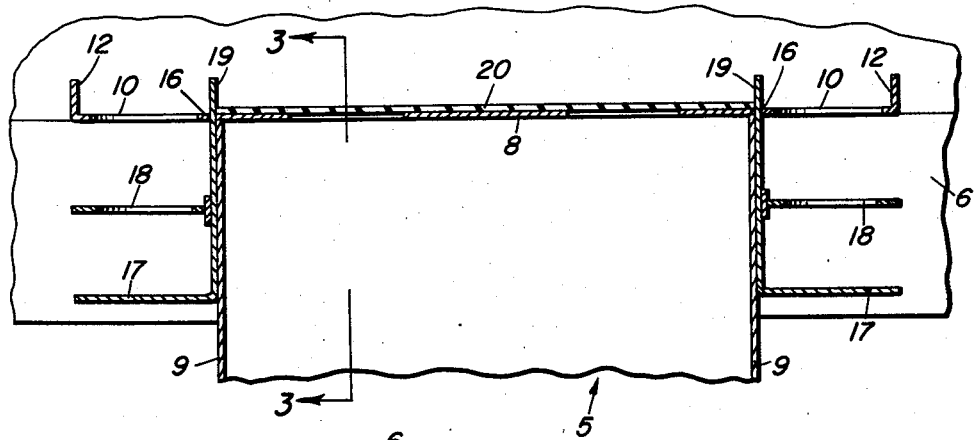
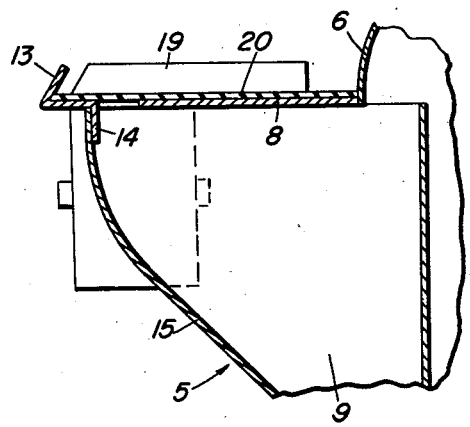
Andrew J. Pavol
  INVENTOR.

United States Patent Office 2,905,370
Patented Sept. 22, 1959

2,905,370
TRAY ATTACHMENT FOR AUTOMOBILE GLOVE COMPARTMENTS

Andrew J. Pavol, Gary, Ind.

Application February 21, 1955, Serial No. 489,672

1 Claim. (Cl. 224—42.32)

The present invention relates to new and useful improvements in automobile trays and has for its primary object to provide, in a manner as hereinafter set forth, a device of this character which is adapted to be expeditiously and firmly but removably mounted in position for use on the usual slidable or pull-out type glove compartment of the vehicle.

Another very important object of the invention is to provide a utility tray of the character described which, in addition to being usable as a map holder, reading desk or snack bar, is also adapted to hold coffee cups, ashtrays, flashlights and other articles.

Other objects of the invention are to provide a tray of the aforementioned character which will be comparatively simple in construction, strong, durable, compact, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view, showing a tray constructed in accordance with the present invention mounted on the glove compartment of an automobile;

Figure 2 is a vertical sectional view, taken substantially on the line 2—2 of Figure 1; and Figure 3 is a vertical sectional view, taken substantially on the line 3—3 of Figure 2.

Referring now to the drawing in detail, it will be seen that reference character 5 designates generally the usual pull-out type glove compartment which is slidably mounted in the instrument panel 6 of an automobile 7.

The embodiment of the present invention which has been illustrated comprises an elongated plate 8 of metal or other suitable material which is adapted to be removably mounted on the slidable glove compartment 5. The end portions of the plate 8 project beyond the side walls 9 of the glove compartment 5 and have formed therein circular openings 10 for the reception of cups, etc. The projecting end portions of the plate 8 are further provided with relatively small openings 11 in which flashlights and other articles may be inserted.

The plate 8 is provided with upturned end and front flanges 12 and 13, respectively. As illustrated to advantage in Figure 3 of the drawing, tongues 14 are struck downwardly from the plate 8 for engagement with the front wall 15 of the compartment 5 for securing said plate against sliding movement in one direction on said compartment. The other longitudinal edge of the plate 8 abuts the instrument panel 6 of the vehicle immediately above the compartment 5.

Adjacent to and inwardly of the openings 10, the plate 8 has formed therein slots 16. Fixed in the slots 16 and depending from the plate 8 are angular brackets 17 which extend beneath the openings 10 for supporting cups and other articles placed therein. Projecting horizontally from the brackets 17 at intermediate points are apertured guides 18 which are aligned with the openings 10 for the reception of the cups and other articles.

The brackets 17 receive the compartment 5 therebetween for retaining the tray against endwise movement thereon. The upper end portions of the brackets 17 rise above the plate 8 for providing what may be considered inner flanges 19. A mat 20 of rubber or other suitable material is placed on the plate 8 between the inner flanges 19.

It is thought that the manner in which the device is used will be readily apparent from a consideration of the foregoing. Briefly, the slidable compartment 5 of the vehicle is pulled outwardly to open position and the unit is mounted astraddle said compartment, the plate 8 resting thereon and the brackets 17 embracing said compartment therebetween. The depending tongues 14 are engaged in the compartment with the front wall 15 thereof. Thus, the device is firmly secured in position on the compartment. Of course, the area between the flanges 19 may be used for various purposes. Cups and other articles placed in the openings 10 may pass through the members 18 and rest on the brackets 17. When desired, the device may be expeditiously removed and stored by simply lifting said device from the compartment 5. The construction is such that the tray may be conveniently used while the vehicle is in motion. Also, the location of the tray is such that it will not obstruct the vision of any of the occupants of the vehicle.

It is believed that the many advantages of an automobile tray constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A tray attachment for a pull-out type automobile glove compartment, said tray for straddling the compartment including an elongated plate mountable transversely on said compartment and comprising end portions projecting beyond the sides thereof and having article receiving openings therein, said plate further having slots therein inwardly of the openings, angular brackets fixed at intermediate points in the slots and projecting above and below the plate, the lower portions of said brackets embracing the compartment therebetween for retaining the plate against longitudinal sliding movement thereon and, further, extending beneath the openings for supporting the articles therein, apertured guides for the articles mounted on the brackets beneath the openings, tongues struck downwardly from the plate and engaged in the compartment for anchoring said plate against rearward sliding movement thereon, a mat on the plate extending between the upper portions of the brackets, and an upstanding flange on one of the longitudinal edges of the plate for retaining the mat in position thereon in conjunction with the brackets.

References Cited in the file of this patent

UNITED STATES PATENTS

| 1,705,898 | Cannon et al. | Mar. 19, 1929 |
| 1,925,083 | Hoidn | Sept. 5, 1933 |
| 1,981,604 | Ondricek | Nov. 20, 1934 |
| 2,080,865 | Lassiter | May 18, 1937 |
| 2,174,650 | Bentz | Oct. 3, 1939 |
| 2,296,028 | Gribble | Sept. 15, 1942 |
| 2,471,030 | Foulke | May 24, 1949 |
| 2,546,459 | Lee | Mar. 27, 1951 |
| 2,554,685 | St. Denis | May 29, 1951 |
| 2,592,032 | Henderson | Apr. 8, 1952 |